(12) United States Patent
Himpe (10) Patent No.: US 11,327,701 B2
(45) Date of Patent: May 10, 2022

(54) SYSTEM AND METHOD FOR CONVERTING GRAPHIC FILES FOR PRINTING

(71) Applicant: ESKO Software BVBA, Ghent (BE)

(72) Inventor: Johan Himpe, Ghent (BE)

(73) Assignee: ESKO Software BVBA, Ghent (BE)

( * ) Notice: Subject to any disclaimer, the term of this patent is extended or adjusted under 35 U.S.C. 154(b) by 0 days.

(21) Appl. No.: 17/112,318

(22) Filed: Dec. 4, 2020

(65) Prior Publication Data
US 2021/0294551 A1 Sep. 23, 2021

Related U.S. Application Data

(60) Provisional application No. 62/992,594, filed on Mar. 20, 2020.

(51) Int. Cl.
*G06F 3/12* (2006.01)
(52) U.S. Cl.
CPC .......... *G06F 3/1285* (2013.01); *G06F 3/1206* (2013.01); *G06F 3/1247* (2013.01); *G06F 3/1296* (2013.01)
(58) Field of Classification Search
CPC combination set(s) only.
See application file for complete search history.

(56) References Cited

U.S. PATENT DOCUMENTS

| | | | |
|---|---|---|---|
| 6,134,018 A | 10/2000 | Dziesietnik et al. | |
| 6,327,050 B1 | 12/2001 | Motamed et al. | |
| 6,348,973 B1 | 2/2002 | Vatland et al. | |
| 6,381,032 B1 | 4/2002 | Laverty et al. | |
| 6,396,593 B1 | 5/2002 | Laverty et al. | |
| 6,850,335 B1 | 2/2005 | Barry et al. | |
| 6,929,411 B2 | 8/2005 | Christiansen et al. | |
| 7,145,669 B2 | 12/2006 | Jacobsen | |
| 7,224,821 B2 | 5/2007 | Furukawa et al. | |
| 7,327,487 B2 | 2/2008 | Prosi | |

(Continued)

FOREIGN PATENT DOCUMENTS

| | | |
|---|---|---|
| EP | 0545261 A1 | 6/1993 |
| EP | 1018258 A1 | 7/2000 |

(Continued)

OTHER PUBLICATIONS

International Search Report and Written Opinion for International Application No. PCT/EP2020/083852, dated Mar. 4, 2021, 12 pages.

*Primary Examiner* — Helen Zong
(74) *Attorney, Agent, or Firm* — RatnerPrestia (57) ABSTRACT

A workflow method for creating a printed sheet from a graphics file and an associated job description. The graphics file and an associated job definition are received in a digital front end (DFE), and a raster imaging processor (RIP) in the DFE converts the graphics file from a native format to RIPped data and stores the RIPped data in digital storage. A print controller retrieves the RIPped data from the digital storage and streams the RIPped data as an output. A communication interface, connected to a screening engine processor, receives the streamed RIPped data and the job definition from the DFE and converts the streamed RIPped data to converted RIPped data having a format readable by the screening engine processor, and to pass information from the screening engine processor to the DFE.

21 Claims, 7 Drawing Sheets

(56) References Cited

U.S. PATENT DOCUMENTS

| | | |
|---|---|---|
| 7,336,380 B2 | 2/2008 | Eisele |
| 7,953,818 B2 | 5/2011 | Chang et al. |
| 8,040,537 B2 | 10/2011 | Smith |
| 8,085,433 B2 | 12/2011 | Arachchige et al. |
| 8,228,540 B2 | 7/2012 | Himpe |
| 8,243,322 B2 | 8/2012 | Nakao et al. |
| 8,330,972 B2 | 12/2012 | Morales et al. |
| 8,355,167 B2 | 1/2013 | Chapman et al. |
| 8,670,149 B2 | 3/2014 | Cogan et al. |
| 8,836,978 B2 | 9/2014 | Ikeda et al. |
| 8,928,914 B2 | 1/2015 | Takenaka |
| 8,933,977 B2 | 1/2015 | Liu et al. |
| 9,207,898 B2 | 12/2015 | Cogan et al. |
| 9,753,677 B2 | 9/2017 | Cogan et al. |
| 9,817,613 B2 | 11/2017 | Kogusuri |
| 9,924,049 B2 | 3/2018 | Sato et al. |
| 9,928,561 B2 | 3/2018 | Filler et al. |
| 10,037,482 B2 | 7/2018 | Davies et al. |
| 10,051,156 B2 | 8/2018 | Chapman et al. |
| 10,235,731 B2 | 3/2019 | Filler et al. |
| 10,296,269 B1 | 5/2019 | Bermundo et al. |
| 2002/0131081 A1 | 9/2002 | Laverty et al. |
| 2003/0076535 A1* | 4/2003 | Prosi ............... G06K 15/00 358/1.16 |
| 2004/0196470 A1 | 10/2004 | Christiansen |
| 2005/0030580 A1 | 2/2005 | Moroi |
| 2006/0120787 A1 | 6/2006 | Abello |
| 2007/0070376 A1 | 3/2007 | Owen et al. |
| 2007/0253027 A1 | 11/2007 | Hiebert |
| 2008/0170255 A1 | 7/2008 | Mazur |
| 2008/0198414 A1 | 8/2008 | Ozawa et al. |
| 2008/0225327 A1 | 9/2008 | Smith |
| 2009/0002726 A1* | 1/2009 | Osadciw ............ G06K 15/1856 358/1.6 |
| 2010/0073695 A1* | 3/2010 | Duggan ............ G06K 15/1848 358/1.6 |
| 2010/0110467 A1 | 5/2010 | Coniglio et al. |
| 2010/0259781 A1 | 10/2010 | Nguyen |
| 2014/0019628 A1 | 1/2014 | Shankar et al. |
| 2014/0198340 A1 | 7/2014 | Bailey |
| 2019/0235800 A1 | 8/2019 | Bermundo et al. |
| 2020/0316935 A1* | 10/2020 | Bullington ............ G06F 3/1282 |
| 2021/0187940 A1* | 6/2021 | Kailey ............... H04N 1/00832 |

FOREIGN PATENT DOCUMENTS

| | | |
|---|---|---|
| EP | 1213645 A2 | 6/2002 |
| EP | 1498839 A2 | 1/2005 |
| EP | 1522010 A2 | 4/2005 |
| EP | 2244178 A2 | 10/2010 |
| EP | 2462542 A1 | 6/2012 |
| EP | 2474938 A2 | 7/2012 |
| EP | 2654284 A1 | 10/2013 |
| EP | 3166301 A1 | 5/2017 |
| EP | 3304486 A1 | 4/2018 |
| WO | 9917539 A1 | 4/1999 |
| WO | 2004006085 A2 | 1/2004 |
| WO | 2011017361 A1 | 2/2011 |
| WO | 2012093060 A2 | 7/2012 |
| WO | 2016196493 A1 | 12/2016 |
| WO | 2007128779 A2 | 11/2017 |
| WO | 2019013796 A1 | 1/2019 |
| WO | 2019125414 A1 | 6/2019 |

* cited by examiner

SYSTEM AND METHOD FOR CONVERTING GRAPHIC FILES FOR PRINTING

CROSS-REFERENCE TO RELATED APPLICATIONS

This application claims priority from U.S. Provisional Application Ser. No. 62/992,594, filed Mar. 20, 2020, titled SYSTEM AND METHOD FOR CONVERTING GRAPHIC FILES FOR PRINTING, the contents of which are incorporated herein by reference.

TECHNICAL FIELD

The present subject matter relates to techniques and equipment to a system and method for converting graphic files for printing.

BACKGROUND

In recent years, printing presses have seen impressive improvements in both printing speed as well as the dots per inch (DPI) printed per image. In fact, modern presses are so quick, their printing speed can regularly outpace the speed at which a Digital Front End (DFE) can send the printing press formatting data. This is due to the pre-printing process requiring multiple processing steps. First, pre-printing requires transforming a potentially lossy digital format, like a JPEG, to a standardized lossless bitmap file. Second, pre-printing requires transforming that standardized lossless bitmap file into instructions that the printing press can actually use: for example, where the press should deploy the yellow, cyan, magenta, and black ink to display the desired image. The first pre-printing step is often performed by one vendor that operates the DFE, and the second pre-printing step is often performed by a second vendor that operates the screener.

This method of two different vendors performing pre-printing separately allows for interchangeability of vendors (as the industry generally uses the same standardized lossless bitmap file format to transfer information from the first step to the second step) at the cost of efficiency. Lossless bitmap files can be very large, and as the density and speed of printing presses improve at an astounding rate, the lossless bitmap files become larger, and need to be handed off faster. Additionally, if the DFE software and the screener software do not have access to the same memory, it is often more efficient to compress the lossless bitmap file before sending it across a network connection, or even to a different segment of memory. Nevertheless, compressing and decompressing the file takes time, time which the DFE and screener software do not have if their operators intend to have their printing presses run at maximum efficiency.

Hence, there is still a need for further improvement in technologies for converting a variety of graphics file formats into suitable instructions directing printing press on how to print an image.

SUMMARY OF INVENTION

One aspect of the invention is a system for printing a graphics file. The system includes a digital front end (DFE) configured to receive the graphics file and an associated job definition. A raster imaging processor (RIP) is configured to convert the graphics file from a native format to RIPped data. A communication interface configured to stream the RIPped data as an output. In some embodiments, the RIP may be integrated with the DFE. In some embodiments the DFE may include digital storage and a print controller configured to access the RIPped data from the digital storage and stream the RIPped data as an output.

The system may further include a communication interface, connected to a screening engine processor and configured to receive the streamed RIPped data and the job definition from the DFE and convert the streamed RIPped data to converted RIPped data having a format readable by the screening engine processor, and to pass information from the screening engine processor to the DFE. The screening engine processor may be configured to generate screened images from the converted RIPped data and the job definition. In some embodiments, the RIP may be integrated with the screening engine processor. The screening engine processor and the DFE may be integrated into a single computer, or may each run on a separate computer. A communications network may be disposed between the DFE and the communication interface. In some embodiments, the RIP may be configured to create the RIPped data by distributed ripping. The graphics file may comprise image information having one or more variable data components, such as graphics corresponding to a label.

The system may further include a printer processor for converting the screened images and the associated job definition into printing instructions executable by printing press, and a printing press configured to execute the printing instructions, such as a digital inkjet printer.

Another aspect of the invention is a workflow method for creating a printed sheet from a graphics file and an associated job description. The method comprises receiving the graphics file and an associated job definition in a digital front end (DFE). The method further comprises using a raster imaging processor (RIP) in the DFE, converting the graphics file from a native format to RIPped data. The method additionally comprises storing the RIPped data in digital storage. The method still further comprises retrieving the RIPped data from the digital storage and streaming the RIPped data as an output. The method additionally further comprises outputting the associated job definition.

The method may further comprise receiving the streamed RIPped data from the DFE in a communication interface of a screening engine; and, using the communication interface, converting the streamed RIPped data into a converted RIPped data format readable by a screening engine processor of the screening engine. The screening engine processor may convert the converted RIPped data to screened images. The method may then further comprise receiving the screened images and the associated job definition; converting, with a printer processor, the screened images and the associated job definition into printing instructions executable by the printing press; and using the printing press, printing a printed image corresponding to the printing instructions. Some exemplary methods may include using a print controller to facilitate retrieving the RIPped data from the digital storage, whereas other method embodiments may include the RIP sending data straight to the screener, without passing through a print controller.

Additional objects, advantages and novel features of the examples will be set forth in part in the description that follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
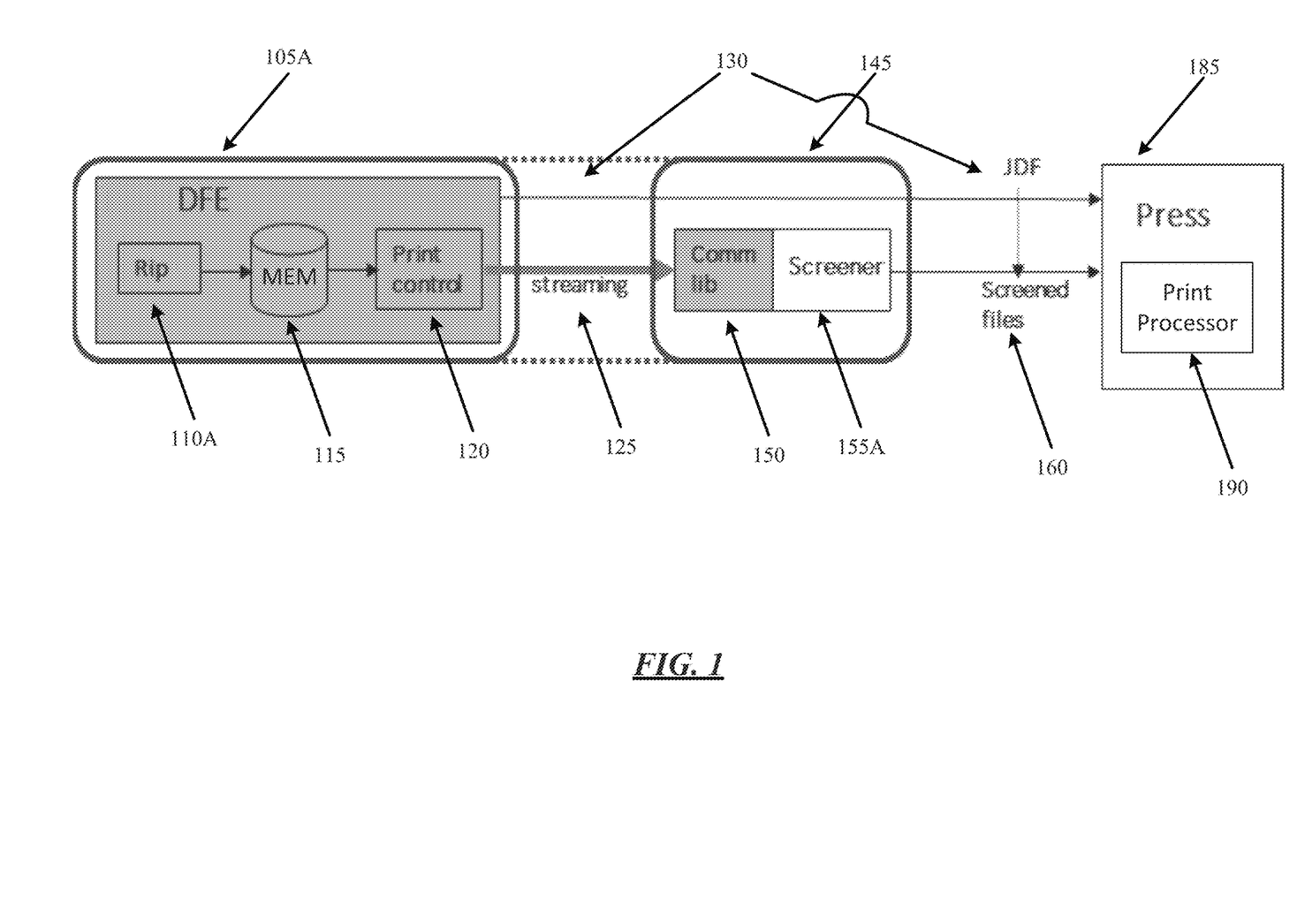
FIG. 1 is a schematic diagram of a graphic file printing system, wherein a digital front end (DFE) service streams graphical data to a screener service via a shared API, which further sends a screened image to a printing press.

Reference now is made in detail to the examples illustrated in the accompanying drawings and discussed below. FIG. 1 illustrates a system for printing a graphics file. The system depicted comprises a digital front end (DFE) 105A, which is configured to receive a graphics file and an associated job definition. This graphics file may be in a variety of formats, such as a joint photographic experts group (JPEG) file, a portable network graphics (PNG) file, or a portable document format (PDF) file. The associated job definition is translated into a job definition format (JDF) message 130, detailing the requirements of the printing job. This JDF message 130 may include, without limitation, the ultimate size of a printed image, resolution, and the ink color model, as well as the total number of prints per image to be pressed. Any instructions that may assist the DFE service 105A, the screening device 145, or the printing press 185 may be included in the JDF message 130.

The DFE 105A includes a raster imaging processor (RIP) 110A configured to convert the graphics file from a native format to RIPped data. In this embodiment, the RIP 110A is software that runs on the DFE 105A hardware, although in other embodiments the RIP 110A may be a separate computing component, or an entirely separate device. RIPped data is generally a standardized bitmap image, as opposed to a compressed, defined, or calculated image file. Additionally usually, the RIPped data is lossless. In some embodiments, in which the graphics to be printed include variable elements and fixed elements from instance to instance, the RIPped data may be segmented into two or more non-overlapping parts or "tiles," as described in more detail in U.S. Pat. No. 8,228,540, titled "RASTERIZING VARIABLE AND NON-VARIABLE DATA FOR PRINTING," incorporated herein by reference. In embodiments that use tiling, the DFE static data is processed only once, and stored and re-used by the printer in conjunction with tiles corresponding to variable data, which are processed by the DFE and downstream components for each sheet to be printed. Additional information regarding how embodiments of the DFE use tiles can be found in Appendix I, titled "Streamer→Screener SDK."

The DFE 105A also includes digital storage 115 configured to receive the RIPped data 125. The DFE 105A additionally includes a print controller 120 configured to access the RIPped data 125 from the digital storage 115, and stream that RIPped data as an output 125. In this embodiment, the print controller 120 is software that runs on the DFE 105A hardware, however in other embodiments the print controller 120 may be a separate computing component, or an entirely separate device. The streamed data is sent to the screening device 145. The screening computer has a communication interface or library 150 and a screening engine processor 155A of the system, configured to generate screened images 160 from the converted RIPped data 125 and the job definition 130. The screening device 145 utilizes the communication library 150 to facilitate this streaming. The communication library 150 passes the data to the screening engine processor 155A via an application programming interface.

The screening device 145 may be on the same physical computing device as the DFE 105A, or a communication network may be disposed between the DFE 105A and the communication interface 150 of the screening device 145. Alternatively, the DFE 105A and the screening device 145 may be integrated into a single computer, or they may each run on a separate computer.

In prior art systems, rather than streaming, RIPped data 125 has historically been converted into a full bitmap file, such as a tagged image file format (TIFF) file, which has been compressed, sent, then decompressed at the screening engine processor 145. By contrast, in the embodiments described herein, the stream of RIPped data 125 itself is sent, saving processing power (and time) that might otherwise be spent on full file conversion, compression, and decompression. This is facilitated, for example, by the API in the communications library 150 allowing for direct data requests and messages, rather than requiring the DFE 105A to convert the RIPped data 125 to a standardized file format. However, in some embodiments, the data stream can still be compressed, but in smaller packages than having to convert, compress, and decompress a full file.

The screened images 160 along with the job definition 130 are sent along to a printer processor 190 in the printing press 185. The printer processor converts the screened images 160 and the associated job definition 130 into printing instructions executable by the printing press 185. Therefore, the system has a printing press 185 configured to execute the printing instructions, such as but not limited to a digital inkjet printer, such as for example a Domino N600i high-speed digital label press. In some embodiments, the printer processor 190 is integrated with the printing press 185, but in other embodiments may be included with the screening engine processor 145.

In some embodiments, the graphics file may comprise image information corresponding to a label having one or more variable data components. In such an example, additional information is sent directing the printing to one of the print controller 120, the screening device 145 or the printing press 185 on how to populate the variable data components, such as, for example, by including such instructions in the associated job definition.

Figure 2:
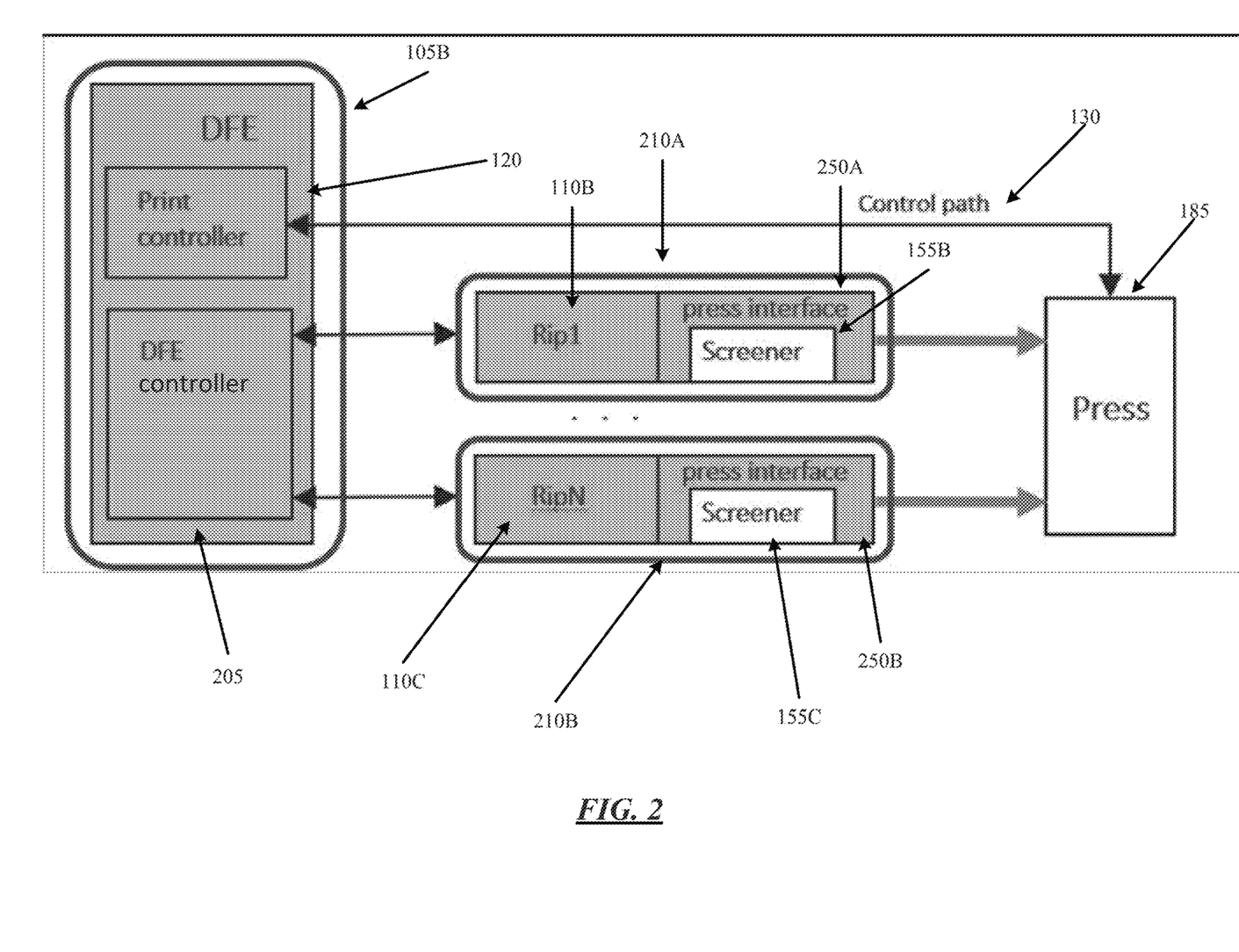
FIG. 2 is a schematic diagram of a graphic file printing system similar to FIG. 1, wherein the DFE sends source graphical data to one or more dual-purpose raster image processor (RIP) and screener service servers, which then send screened images to a printing press.

FIG. 2 illustrates a distributed RIP configuration for printing a graphics file. Here, DFE 105B has a print controller 120 and DFE controller 205. The DFE controller 205 comprises software for uploading a graphic file and for creating or uploading a job definition 130. In this embodiment, however, there are multiple RIP devices 210A-B, each with their own RIP 110B-C, screening engine processor 155B-C, and interface 250A-B similar to communications interface 150. Here, the DFE 105B sends the graphics file to one of many RIP devices 210A-B for rasterizing, rather than performing rasterizing within the DFE 105B. The RIP devices 210A-B also interface with internal screening engine processors 155B-C using the API messages such as those described herein with respect to communications between the communication library 150 and the screening engine processor 155A. RIP devices 210A-B ultimately generate screened images.

RIP devices 210A-B do not receive the job definition 130 in this embodiment, and only generate a screened image. DFE 105B directly sends the job definitions 130 to the printing press 185. Printing press 185 requests screened images upon completion of screening from the RIP devices 210A-B, and once the printing press 185 has both a screened image and a job definition 130 for a given graphics file, it can commence the process of printing the screened images to the specification of the job definition 130. This embodiment may be more efficient, as it allows the system to have as many RIPs 110B-C paired with screening engine processors 155B-C as the system operator desires. This can improve performance speed when the bottleneck is either the RIP 110A or the screening engine processor 155A. In this embodiment, the RIP sends data to the screener without passing through the print controller.

Figure 3:
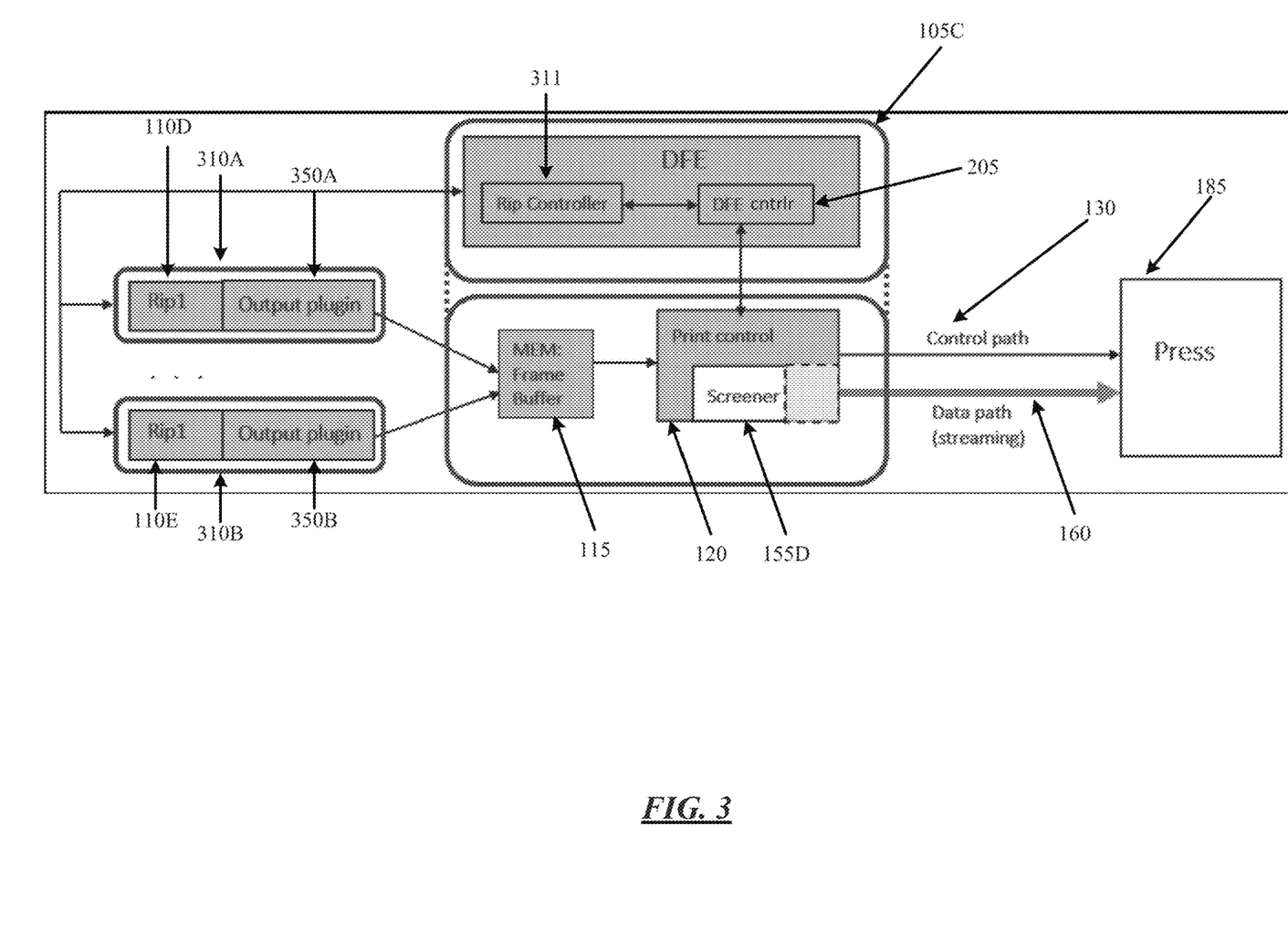
FIG. 3 is a schematic diagram of a graphic file printing system similar to FIG. 1, wherein the DFE outsources rasterization to one or more RIP servers, which then return their output to the DFE for screener servicing and for sending screened images to a printing press.

FIG. 3 is another alternatively organized configuration of a system for printing a graphics file. Here, DFE 105C has a DFE controller 205, as well as a RIP controller 311. A RIP controller 311 is a controller for one or more RIP devices 310A-B and directs RIP devices 310A-B as to what graphics files they should rasterize and when they should rasterize. RIP devices 310A-B do not have a screening engine processor 155B-C onboard, but instead include RIP 110D-E, and a plugin 350A-B that stores the rasterized data in the digital storage framebuffer 115.

In this embodiment, the DFE 105C sends the graphics file to one of many RIP devices 310A-B for rasterizing, rather than performing rasterizing within the DFE 105C. The RIP devices 310A-B also interface with internal output plugins 350A-B. These plugins store the rasterized data in the digital storage framebuffer 115. RIP devices 310A-B generate rasterized images, but not screened images.

The rasterized images from the RIP devices 310A-B are streamed by the output plugins 350A-B into a digital storage frame buffer 115, where they await the print controller's 120 election to use the rasterized image. Print controller 120 in this embodiment is similar to that as described with respect to FIG. 1, except this print controller 120 is integrated with screening engine processor 155D, and has images and instructions tailored to interface with the screening engine processor 155D from the output plugins 350A-B of the RIP devices 310A-B. The print controller 120 passes this data from the digital storage frame buffer 115 to the screening engine processor 155D by means of API messages similar to those utilized in the communication between the communication library 150 and the screening engine processor 155A.

Once the printing press 185 has availability, the print controller 120 sends job instructions 130 and streaming data 160 prepared by the screening engine processor 155D to the printing press 185 for printing. This embodiment may be relatively more efficient than other configurations, as it allows the system to have as many RIPs 110D-E as the system operator desires. Because the screening engine processor 155D is not coupled to the RIPs 110D-E, this embodiment may have advantages over the embodiment described with respect to FIG. 2 if the bottleneck is not the screening engine processor 155D, but rather the RIPs 110D-E.

Figure 4:
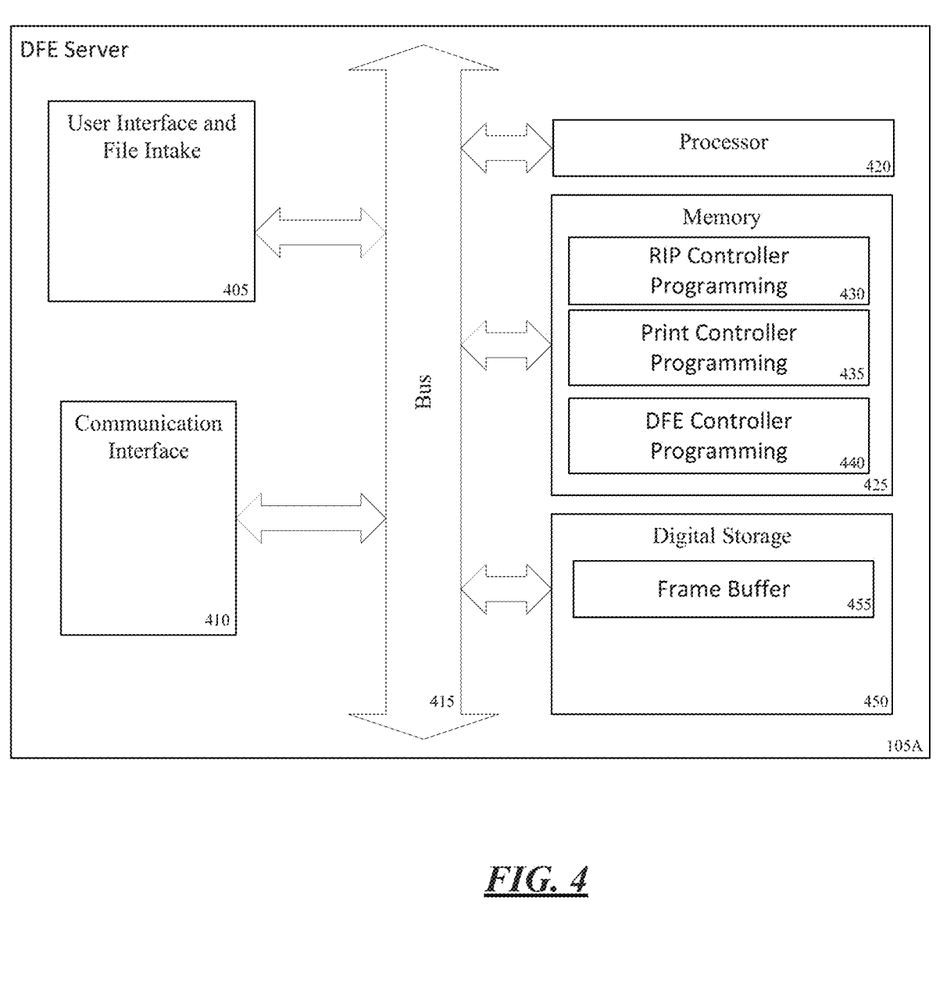
FIG. 4 is a block diagram of the hardware and software involved in operating the DFE server depicted in FIG. 1.

FIG. 4 is a block diagram of an exemplary DFE server 105A, such as the one shown in FIG. 1, showing hardware and software inside DFE server 105A.

Figure 6:
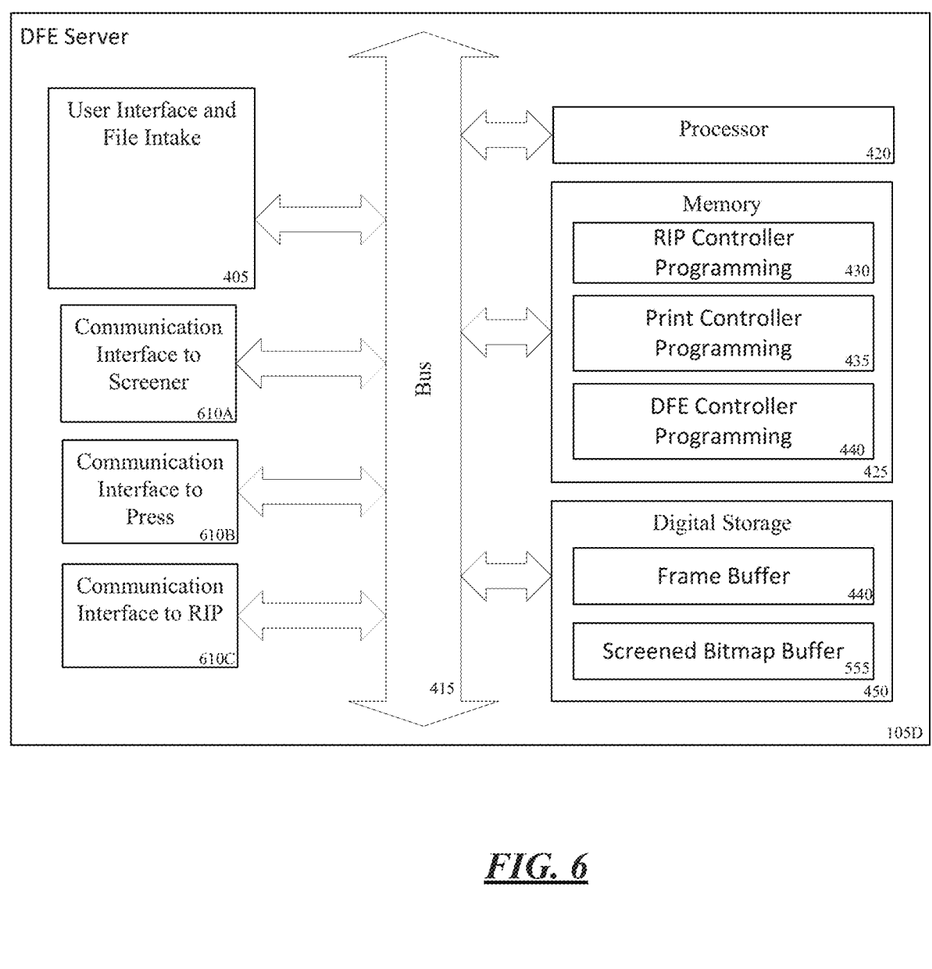
FIG. 6 is a block diagram of the hardware and software involved in operating an alternative design for the DFE server, similar to those depicted in FIG. 2 and FIG. 3.

User interface and file intake 405 of FIG. 4 and FIG. 6 are interfaces for a user to upload one or more graphics files, along with instructions on how to print those graphics flies.

The interface of the DFE server 105A may be, for example and without limitation, a touchscreen device where print job instructions are inputted via a user interface application through manipulation or gestures on a touch screen. For output purposes, the touch screen of the user interface and file intake 405 includes a display screen, such as a liquid crystal display (LCD) or light emitting diode (LED) screen or the like. For input purposes, a touch screen includes a plurality of touch sensors.

In other embodiments, a keypad may be implemented in hardware as a physical keyboard of the user interface and file intake 405, and keys may correspond to hardware keys of such a keyboard. Alternatively, some or all of the keys (and keyboard) may be implemented as "soft keys" of a virtual keyboard graphically represented in an appropriate arrangement via touch screen. The soft keys presented on the touch screen may allow the user of the DFE server 105A to invoke the same user interface functions as with the physical hardware keys. The user interface is not limited to any particular hardware and/or software for facilitating user input, however.

The user interface and file intake 405 may have a graphical interface, such as a screen, and tactile interfaces, like a keyboard or mouse. It may also have a command line interface that allows for text input commands. The user interface and file intake may also have a port to accept a connection from an electronic device containing a graphics file to be printed.

Figure 5:
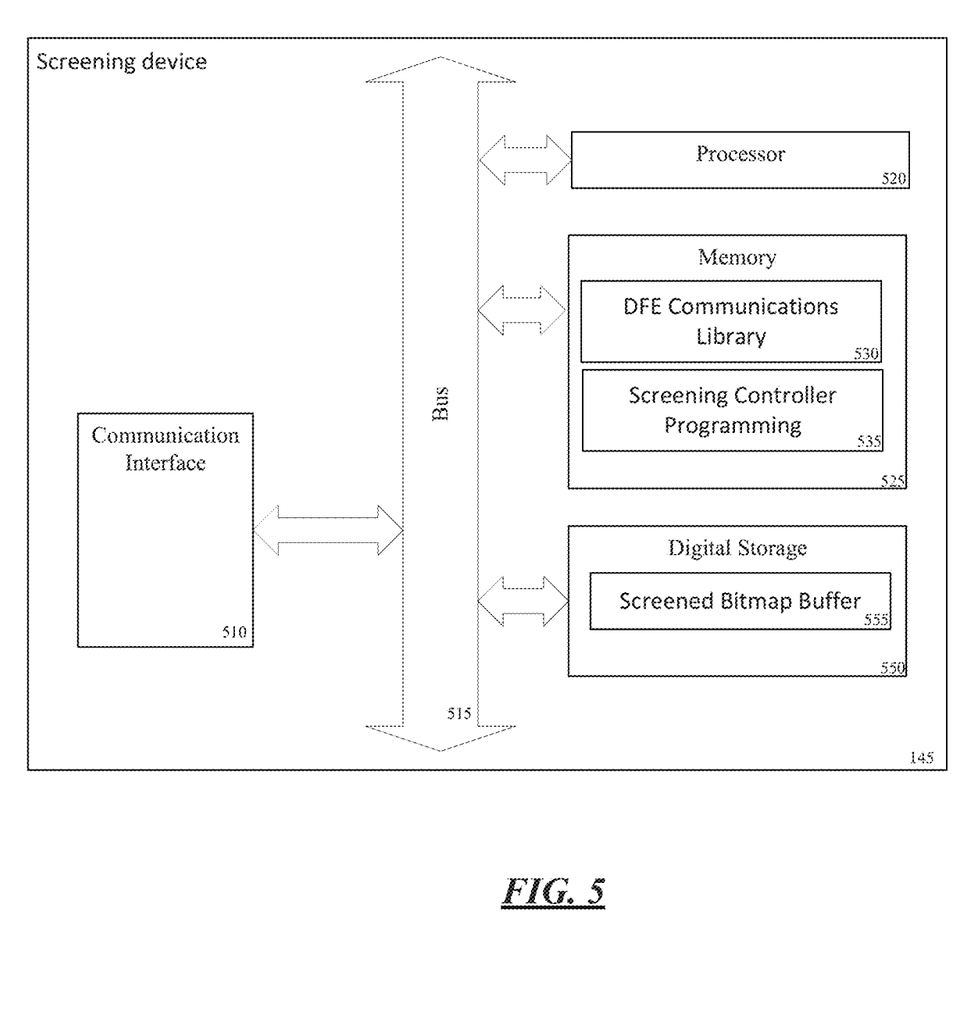
FIG. 5 is a block diagram of the hardware and software involved in operating the screener server in FIG. 1.
Figure 7:
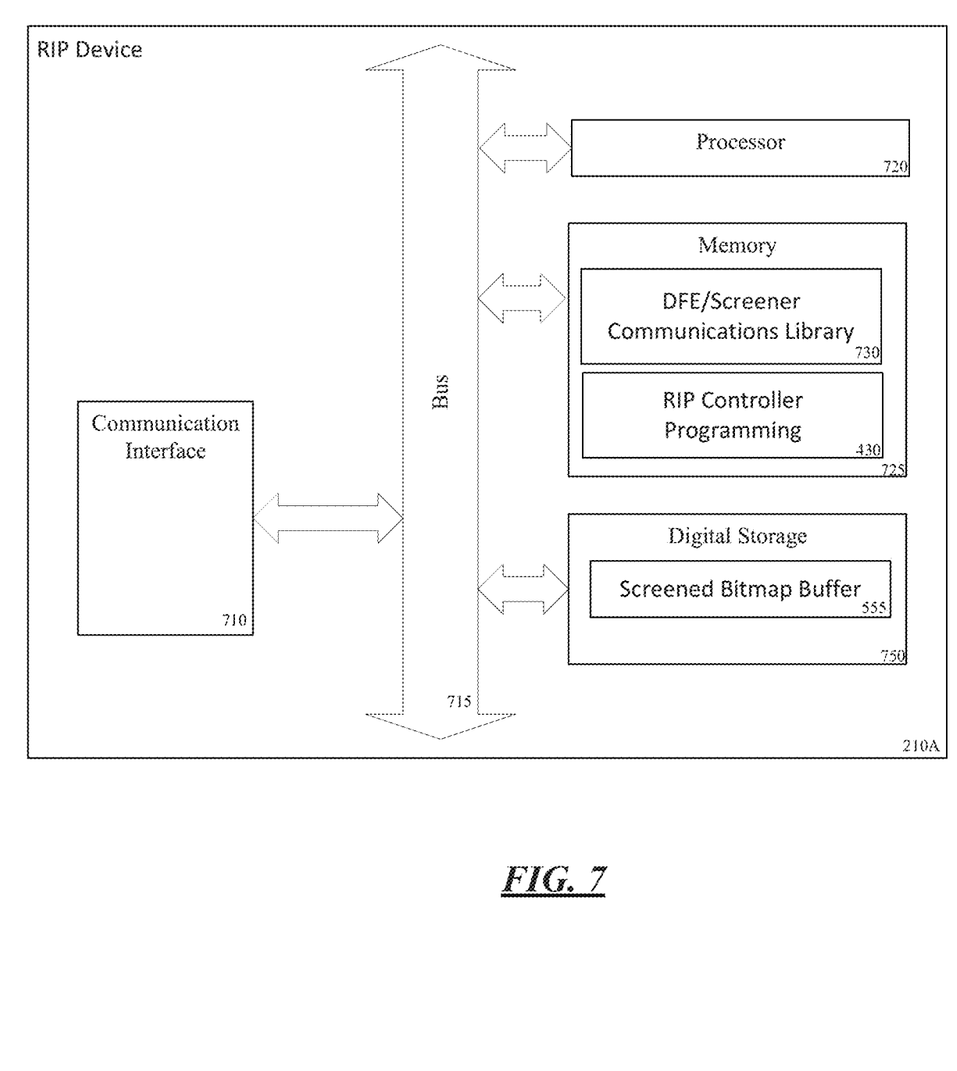
FIG. 7 is a block diagram of the hardware and software involved in operating one of the RIP servers in FIG. 2.

Communication interface system 410 of FIG. 4, communication interface system 510 of FIG. 5, communication interface to screener 610A of FIG. 6, communication interface to the press 610B of FIG. 6, communication interface to the RIP 610C of FIG. 6 (for embodiments in which the RIP is not integrated with the DFE), and communication interface system 710 of FIG. 7 allow for data communication (e.g., wired or wireless) over various networks or direct connections.

Bus 415 of FIG. 4, Bus 515 of FIG. 5, Bus 415 of FIG. 6, and Bus 715 of FIG. 7 allow for data communication between components within the devices and servers. The bus 415, 515, 715 may be a physical bus, or it may be a programmatic messaging bus. Some or all of the components depicted as communicating over the bus 415, 515, 715 may be integrated components, and may directly communicate, rather than by passing messages along the bus 415, 515, 715.

Processor 420 of the DFE server 105A of FIG. 4, processor 520 of the screening device 145 of FIG. 5, processor 420 of the DFE Server 105D of FIG. 6, and processor 720 of the RIP device 210A of FIG. 7, serve to perform various operations, for example, in accordance with instructions or programming executable by processors 420, 520, 720. For example, such operations may include operations related to communications between different graphics file printing components, or for transforming graphics files into other formats. Although a processor 420, 520, 720 may be configured by use of hardwired logic, typical processors may be general processing circuits configured by execution of programming. Processors 420, 520, 720 include elements structured and arranged to perform one or more processing functions, typically various data processing functions. Although discrete logic components may be used, the examples utilize components forming a programmable CPU. A processor 420, 520, 720, for example, includes one or more integrated circuit (IC) chips incorporating the electronic elements to perform the functions of the CPU. The processors 420, 520, 720, for example, may be based on any known or available microprocessor architecture, such as a Reduced Instruction Set Computing (RISC) using an ARM architecture, commonly used in mobile devices and other portable electronic devices. Of course, other processor circuitry may be used to form the CPU or processor hardware in DFE Server 105A, 105D, screening device 145, or RIP device 210A.

Memory 425 of the DFE server 105A of FIG. 4, memory 525 of the screening device 145 of FIG. 5, memory 425 of the DFE Server 105D of FIG. 6, and memory 725 of the RIP device 210A of FIG. 7, are for storing data and programming. In the example, the main memory system 425, 525, 725 may include a flash memory (non-volatile or persistent storage) and a random access memory (RAM) (volatile storage). The RAM serves as short-term storage for instructions and data being handled by the processors 420, 520, 720, e.g., as a working data processing memory. The flash memory typically provides longer-term storage.

Digital storage 450 of the DFE server 105A of FIG. 4, digital storage 550 of the screening device 145 of FIG. 5, digital storage 450 of the DFE Server 105D of FIG. 6, and digital storage 750 of the RIP device 210A of FIG. 7, are for storing processed graphics data. In the example, the digital storage system 450, 550, 750 may include a flash memory (non-volatile or persistent storage) and a random access memory (RAM) (volatile storage). The RAM serves as short-term storage for instructions and data being handled by the processors 420, 520, 720, e.g., as a working data processing memory. The flash memory typically provides longer-term storage.

The instructions, programming, or application(s) may be software or firmware used to implement any other device functions associated with DFE server 105A, 105D, screening device 145, and RIP device 210A. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 425, 525, 725 or a memory of a computer used to download or otherwise install such programming into the DFE server 105A, 105D, screening device 145, and RIP device 720, or a transportable storage device or a communications medium for carrying program for installation in the DFE server 105A, 105D, screening device 145, and RIP device 210A.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The memory 425 of the DFE server 105A includes the RIP controller programming 430. This programming 430 performs the rasterizing of a graphics file into a standardized bitmap image. The memory 425 further contains the print controller programming 435. This programming 435 controls the rate and timing at which the DFE server 105A sends standardized bitmap images via the communication interface 410 to the screening device 145. The memory 425 additionally contains the DFE controller programming 440. This programming 440 controls the DFE itself, including the user interface and file intake 405, the various components of the device 105A, and any other programming required to facilitate the functionality of the DFE server 105A.

The digital storage 450 of the DFE server 105A includes the frame buffer 455, which is the buffer of standardized bitmap images rasterized by the execution of the RIP controller programming that have not yet been sent to the screening device 145.

FIG. 5 is a block diagram of an exemplary screening device 145. The physical components of the screening device 145 are well-understood computing components, and are described in FIG. 4.

The memory 525 of the screening device 145 includes the DFE communications library 530. This is the API library that allows the DFE server 105A or the RIP programming 110B-C to communicate streamed rasterized image data to the screening device 145 without needing to transform rasterized image data into an interstitial format, compress the transformed rasterized image data, then un-compress the transformed rasterized image data at the screening device 145. The memory 525 additionally contains the screening controller programming 535. This programming 535 controls the screening device 145 itself, including the various components of the device 145 and any other programming required to facilitate the functionality of the screening device 145. The screening controller programming 535 is also the programming that allows conversion of a rasterized file into a screened image, ready for printing via printing press 185.

The digital storage 550 of the screening device 145 contains a screened bitmap buffer 555. This screened bitmap buffer 555 is a buffer of the screened bitmap images screened by the screening device 145 that are awaiting printing by the printing press 185.

FIG. 6 is a block diagram of another example DFE server 105D. The physical components of the DFE server 105D are well-understood computing components, and are described in FIG. 4. As compared to the configuration depicted in FIG. 4, rather than a single communication interface 410, there are three separate communication interfaces: one communication interface 610A designed to interface with a screening device 145, another communication interface 6105 designed to interface with a printing press 185, and a third communication interface 610C designed to interface with a RIP device 310A-8.

The programming in the memory 430 of the DFE server 105D is described in FIG. 4 as well. This exemplary DFE server 105D is configured to perform rasterization of graphics files, buffer those rasterized files, send the rasterized files to a screening device 145, receive screened images 160 back from the screening device 145, buffer those screened images, and send those screened images and job instructions to the printing press 185.

The digital storage 450 of this DFE server 105D has a frame buffer 440 that operates as described in FIG. 4. The digital storage 450 also contains a screened bitmap buffer 555, except the screened bitmap buffer 555 of the DFE server 105D does not contain screened images generated by the DFE server 105D, but rather screened images sent from a screening device 145 via the communication interface to screener 610A.

FIG. 7 is a block diagram of an exemplary RIP device 201A. The physical components of the RIP device 201A are well-understood computing components, and are described in FIG. 4.

The memory 725 of the RIP device 210A includes the DFE/Screener communications library 730. This is the API library that allows the RIP Device 210A to communicate streamed rasterized image data to the screening device 145 or DFE server 105D without needing to transform rasterized image data into an interstitial format, compress the transformed rasterized image data, then un-compress the transformed rasterized image data at the screening device 145. The memory 525 additionally contains the RIP controller programming 535. This programming 430 controls the RIP device 210A itself, including the various components of the device 210A and any other programming required to facilitate the functionality of the RIP device 201A. The RIP controller programming 430 is also the programming that allows conversion of a graphics file into a rasterized file, ready for screening via screening device 145.

The digital storage 750 of this RIP device 210A has a screened bitmap buffer 555 that operates as described in FIG. 6.

It should be understood that all of the figures as shown herein depict only certain elements of an exemplary system, and other systems and methods may also be used. Furthermore, even the exemplary systems may comprise additional components not expressly depicted or explained, as will be understood by those of skill in the art. Accordingly, some embodiments may include additional elements not depicted in the figures or discussed herein and/or may omit elements depicted and/or discussed that are not essential for that embodiment. In still other embodiments, elements with similar function may substitute for elements depicted and discussed herein.

Any of the steps or functionality of the system and method for converting graphic files for printing can be embodied in programming or one more applications as described previously. According to some embodiments, "function," "functions," "application," "applications," "instruction," "instructions," or "programming" are program(s) that execute functions defined in the programs. Various programming languages may be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "Including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected may lie in less than all features of any single disclosed example. Hence, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. A system for printing a graphics file comprising image information having at least one variable component, the system comprising:
    a digital front end (DFE) configured to receive the graphics file and an associated job definition;
    a raster imaging processor (RIP) configured to convert the graphics file from a native format to RIPped data;
    a communication interface configured to stream the RIPped data as an output, the RIPped data output segmented into a plurality of non-overlapping tiles, including a background matrix comprising a dense matrix of background RIPped data tiles and a foreground matrix comprising a sparse matrix of foreground RIPped data tiles; and
    a screening device comprising a communication interface connected to a screening engine processor, the communication interface configured to receive the streamed RIPped data and the job definition from the DFE and convert the streamed RIPped data to converted RIPped data having a format readable by the screening engine processor, and to pass information from the screening engine processor to the DFE; and
wherein the screening device is configured to:
    receive, via the communication interface, a first streamed background matrix of first background RIPped data tiles;
    receive, via the communication interface, a first streamed foreground matrix of first foreground RIPped data tiles;
    generate, via the screening image processor, a screened image from the first streamed background matrix and the first streamed foreground matrix;
    instruct, via the communication interface, the RIP to free the first foreground matrix;
    receive, via the communication interface, a one or more additional streamed foreground matrices of additional foreground RIPped data tiles;
    convert, via the communication interface, each additional streamed foreground matrix to corresponding converted RIPped data having a format readable by the screening engine processor;
    generate, via the screening image processor, a screened image corresponding to each of the additional streamed foreground matrices and the first streamed background matrix;
    instruct, via the communication interface, the RIP to free each additional second foreground matrix; and
    instruct, via the communication interface, the RIP to free the first streamed background matrix.

2. The system of claim 1, wherein the screening engine processor is configured to generate screened images from the converted RIPped data and the job definition, wherein the screened images include:
    background screened image data corresponding to the background RIPped data tiles for areas having no variable content; and
    foreground screened image data corresponding to the foreground RIPped data tiles for areas having variable content.

3. The system of claim 2, further comprising a printer processor for converting the screened images and the associated job definition into printing instructions executable by printing press.

4. The system of claim 3, further comprising:
    a printing press configured to execute the printing instructions.

5. The system of claim 1, further comprising a communications network disposed between the DFE and the communication interface.

6. The system of claim 1, wherein the screening engine processor and the DFE are integrated into a single computer.

7. The system of claim 1, wherein the screening engine processor and the DFE each run on a separate computer.

8. The system of claim 1, wherein the RIP is integrated with the screening engine processor.

9. The system of claim 1, wherein the screening device is further configured to:
    receive, via the communication interface, at least one additional streamed background matrix of additional background RIPped data tiles;
    receive, via the communication interface, one or more subsequent foreground matrices of subsequent foreground RIPped data tiles;
    convert, via the communication interface, each additional streamed background matrix and each subsequent foreground matrix to corresponding RIPped data having a format readable by the screening engine processor;
    generate, via the screening image processor, one or more subsequent screened images corresponding to the at least one additional streamed background matrix and the one or more subsequent streamed foreground matrices;
    instruct, via the communication interface, the RIP to free the one or more subsequent foreground matrices;
    instruct, via the communication interface, the RIP to free the at least one additional streamed background matrix.

10. The system of claim 1, wherein the RIP is configured to create the RIPped data by distributed ripping.

11. The system of claim 1, wherein the graphics file comprises image information corresponding to a label.

12. The system of claim 1, wherein the digital printing press comprises a digital inkjet printer.

13. The system of claim 1, wherein the DFE further includes digital storage configured to receive the RIPped data; and a print controller configured to access the RIPped data from the digital storage and stream the RIPped data as an output via the communication interface.

14. The system of claim 1, wherein the RIP is integrated with the DFE.

15. The system of claim 1, wherein the system comprises a communications library having an application program interface configured to allow direct data requests and messages and configured for streaming the background RIPped data and the foreground RIPped data without transformation into an interstitial format and without compression.

16. A workflow method for creating a printed sheet from a graphics file and an associated job description, the method comprising:
(a) receiving the graphics file and an associated job definition in a digital front end (DFE);
(b) using a raster imaging processor (RIP) in the DFE, converting a background portion of the graphics file from a native format to background RIPped data;
(c) using the RIP in the DFE, converting a foreground portion of the graphic file from a native format to foreground RIPped data;
(d) storing the background and foreground RIPped data in digital storage;
(e) retrieving the background RIPped data and the foreground RIPped data from the digital storage, and streaming the background RIPped data as a dense matrix of background RIPped data tiles and the foreground RIPped data as a sparse matrix of foreground RIPped data tiles;
(f) outputting the associated job definition;
(g) receiving the streamed background RIPped data and the foreground RIPped data from the DFE in a communication interface of a screening device;
(h) using the communication interface, converting the streamed background RIPped data and the foreground RIPped data into a converted RIPped data format readable by a screening engine processor of the screening device;
(i) receiving, via the communication interface, a first streamed background matrix of first background RIPped data tiles;
(j) receiving, via the communication interface, a first streamed foreground matrix of first foreground RIPped data tiles;
(k) generating, via the screening image processor, a screened image from the first streamed background matrix and the first streamed foreground matrix:
(l) instructing, via the communication interface, the RIP to free the first foreground matrix;
(m) receiving, via the communication interface, one or more additional streamed foreground matrices of additional foreground RIPped data tiles;
(n) converting, via the communication interface, each additional streamed foreground matrix to corresponding converted RIPped data having a format readable by the screening engine processor;
(o) generating, via the screening image processor, a screened image from each of the additional streamed foreground matrices and the first streamed background matrix;
(p) instructing, via the communication interface, the RIP to free each additional second foreground matrix; and
(q) instructing, via the communication interface, the RIP to free the first streamed background matrix.

17. The method of claim 16, further comprising:
(r) using the screening engine processor, generating screened images from the converted RIPped data and the job definition, wherein the screened images include:
background screened image data corresponding to the background RIPped data tiles for areas having no variable content; and
foreground screened image data corresponding to the foreground RIPped data tiles for areas having variable content.

18. The method of claim 17, further comprising:
(s) receiving, with a printer processor, the screened images and the associated job definition;
(t) converting, with the printer processor, the screened images and the associated job definition into printing instructions executable by the printing press; and
using the printing press, printing a printed image corresponding to the printing instructions.

19. The method of claim 16, wherein the RIPped data from the digital storage is retrieved using a print controller of the DFE.

20. The method of claim 16, further comprising:
(r) receiving, via the communication interface, at least one additional streamed background matrix of additional background RIPped data tiles;
(s) receiving, via the communication interface, one or more subsequent foreground matrices of subsequent foreground RIPped data tiles;
(t) converting each additional streamed background matrix and each subsequent foreground matrix to corresponding RIPped data having a format readable by the screening engine processor;
(u) generating, via the screening image processor, one or more subsequent screened images from at least one additional streamed background matrix and the one or more subsequent streamed foreground matrices;
(v) instructing, via the communication interface, the RIP to free the one or more subsequent foreground matrices;
(w) instructing, via the communication interface, the RIP to free the at least one additional streamed background matrix.

21. The method of claim 16, wherein the step of streaming the background RIPped data and the foreground RIPped data comprises streaming the data without transformation into an interstitial format and without compression.

* * * * *